No. 803,755. PATENTED NOV. 7, 1905.
A. E. GUY.
OBTURATOR FOR FLEXIBLE SHAFTS.
APPLICATION FILED APR. 3, 1905.
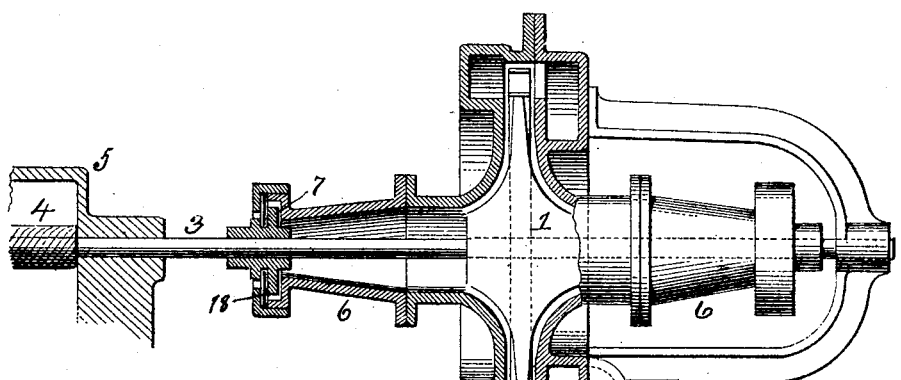
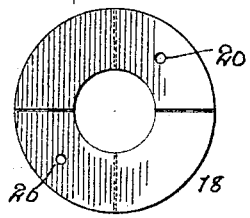
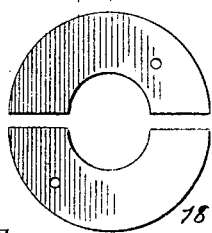
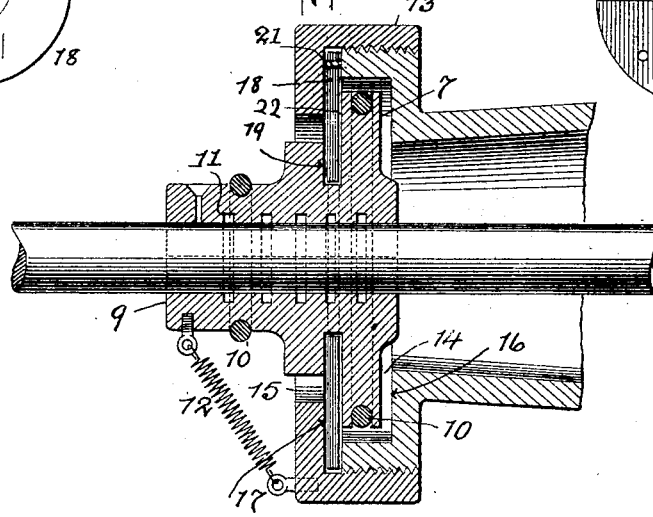
WITNESSES:
Gustave Dieterich
Edwin H Dieterich
INVENTOR
Hebert E. Guy
BY Paul Benjamin
his ATTORNEY

UNITED STATES PATENT OFFICE.

ALBERT E. GUY, OF TRENTON, NEW JERSEY, ASSIGNOR TO DELAVAL STEAM TURBINE COMPANY, OF NEW YORK, N. Y.

OBTURATOR FOR FLEXIBLE SHAFTS.

No. 803,755.      Specification of Letters Patent.      Patented Nov. 7, 1905.

Application filed April 3, 1905. Serial No. 253,447.

*To all whom it may concern:*

Be it known that I, ALBERT E. GUY, of Trenton, Mercer county, New Jersey, have invented a new and useful Improvement in Obturators for Flexible Shafts, of which the following is a specification.

The invention relates to rotary flexible shafts such as are employed in high-speed turbines to support the rotating member and to transmit power therefrom.

The invention consists, broadly, in means for producing a tight joint between said shaft and a wall through which it extends irrespective of the deflections of said shaft due to the lack of balance of the rotating body which it supports.

In the accompanying drawings, Figure 1 is a section of a turbine-wheel of usual construction, showing the obturator in place on the wheel-shaft. Fig. 2 is an enlarged section of the obturator and associated parts. Figs. 3 and 4 show the plates forming the flexible diaphragm-plates, Fig. 3 illustrating more particularly the manner of placing said plates together so as to break joints.

Similar numbers of reference indicate like parts.

1 is an axial-flow turbine-wheel. 2 is the casing therefor. 3 is the flexible shaft, on which is secured wheel 1, and 4 is a helicoidal gear disposed in the case 5 for transmitting motion from shaft 3. These parts, with the steam and exhaust passages in the wheel-casing, are of the usual and well-known construction.

The flexible shaft 3 extends through projections 6, forming part of the casing 2, and has hitherto been provided with an obturator-disk 7 of metal. Said disk, with its hub 9, is made in half-sections held together upon the shaft by means of springs 10, seated in circumferential grooves. On the inner surface of the hub are grooves 11, which are kept filled with oil. The obturator-hub is prevented from turning with the shaft by means of the helical spring 12, connected at one end to an eye on said hub and at the other end to an eye on the threaded cover or gland 13, which forms one side of the chamber 14, in which the obturator-disk is inclosed. In the cover 13 is an opening 15.

The working of the parts as thus far described is as follows: When the wheel operates condensing, the atmospheric pressure forces the obturator-disk against the inner face 16 of the chamber 14, thus closing the joint between disk and casing. When the wheel operates non-condensing, the pressure within the casing forces the disk 7 against the inner face 17 of the gland 13, and thus again forms a close joint. This device is effective so long as the shaft is not deflected by the rotation of the member—namely, the wheel—which it carries; but, as is well known, the object of the flexible shaft is to permit a certain amount of lateral movement of the rotating member carried by it in order to effect compensation for lack of balance of said member. In such case the shaft assumes an oblique position or, in other words, becomes deflected, so that there results imperfect contact between the faces of the obturator-disk 7 and the face of the gland or chamber, with consequent leakage of air or steam, as the case may be. In order to overcome this difficulty, I provide an annular diaphragm 18, the outer circumferential portion of which is clamped between gland 13 and casing 2, and the inner portion enters a groove 19 in the hub 9. Said diaphragm is to be made of flexible material—such as leather, fiber, or thin metal—and is preferably in half-sections, as shown in Fig. 4, so as to be easily placed in position. It is better to make it of several thin plates of metal, such as copper sheets, each about two one-thousandths of an inch in thickness, and to assemble the half-sections so as to break joints, as illustrated in Fig. 3. After they are put together holes 20 may be made through them to receive pins 21 on the inner face of casing 2, which pins will prevent the relative displacement of the individual parts of the diaphragm.

When the flexible shaft, which turns freely in the hub 9, assumes an oblique position, and thus forms an imperfect joint, as before described, the external atmospheric pressure forces the diaphragm against the outer face 22 of the disk 7, and by reason of the flexibility of the diaphragm permitting the same to adjust itself to whatever inclination the disk may assume owing to the deflection of the shaft 3, and so to maintain a tight joint. On the other hand, if pressure exists within the casing and the disk 7 is forced outwardly the joint between its face 22 and the inner face of the gland 13 is packed by the flexible diaphragm which becomes compressed between said faces.

I claim—

1. A wall on opposite sides of which a difference of fluid-pressure exists and having an opening, a flexible shaft extending through said opening and means for preventing leakage of said fluid around said shaft and between said shaft and said wall, due to deflection of said shaft.

2. In an elastic-fluid motor a casing, a rotating member therein, a flexible shaft on which said member is fixed extending through a wall of said casing, and means for preventing leakage of elastic fluid around said shaft and between said shaft and said wall, due to deflection of said shaft.

3. The combination of a flexible shaft, a wall through which said shaft passes, a member supported on said shaft and operating when said shaft is rotated to cause a deflection thereof, a disk in which said shaft is free to rotate and means for maintaining a tight joint between a face of said disk and said wall.

4. The combination of a flexible shaft, a wall through which said shaft passes, a member supported on said shaft and operating when said shaft is rotated to cause a deflection thereof, a disk in which said shaft is free to rotate, means for preventing the rotation of said disk and means for maintaining a tight joint between a face of said disk and said wall.

5. A casing, a rotary member therein, a flexible shaft on which said member is fixed extending through a wall of said casing, bearings for said shaft external to said casing, and means not rotating with said shaft interposed between said shaft and said casing-wall for maintaining a close joint between said parts during all positions of said shaft while in rotation.

6. An elastic-fluid turbine-wheel, a casing therefor, a flexible shaft supporting said wheel and extending through the walls of said casing, bearings for said shaft external to said casing, and means not rotating with said shaft interposed between said shaft and said casing-wall for maintaining a close joint between said parts during all positions of said shaft while rotated by said wheel.

7. A casing, a rotary member therein, a continuous flexible shaft on which said member is fixed, extending through the opposite walls of said casing, bearings for said shaft external to said casing and means not rotating with said shaft interposed between said shaft and said casing-walls for maintaining a close joint between said parts during all positions of said shaft while in rotation.

8. A rotary motor-wheel, a casing therefor, a flexible shaft on which said wheel is fixed and extending through a wall of said casing, a bearing for said shaft outside of said casing, means not rotating with said shaft interposed between said shaft and said casing-wall for maintaining a close joint between said parts during all positions of said shaft while in rotation, and on the opposite side of said bearing and carried by said shaft, a power-transmitting gear.

9. The combination of a casing, a flexible shaft extending through a wall thereof, a disk surrounding said shaft and a flexible diaphragm interposed between a face of said disk and said wall.

10. The combination of a casing, a flexible shaft extending through a wall thereof, a disk surrounding said shaft and a flexible diaphragm secured to said casing and interposed between a face of said disk and said wall.

11. The combination of a casing, a flexible shaft extending through a wall thereof, a disk, a hub carrying said disk and loose on said shaft and a flexible annular diaphragm seated in a groove on said hub and interposed between a face of said disk and said wall.

12. The combination of a casing, a flexible shaft extending through a wall thereof, a disk surrounding said shaft and a flexible diaphragm interposed between the outer face of said disk and said wall: the said wall having an opening in front of said disk.

13. The combination of a casing, a flexible shaft extending through a wall thereof, a disk surrounding said shaft and a flexible diaphragm formed of a plurality of thin sheets interposed between a face of said disk and said wall.

14. The combination of a casing, a rotary flexible shaft extending through a wall thereof, a disk surrounding said shaft, a flexible diaphragm interposed between a face of said disk and said wall, and means for preventing the rotation of said diaphragm by said shaft.

15. The combination of a casing, a rotary flexible shaft extending through a wall thereof, a disk surrounding said shaft, a flexible diaphragm formed of a plurality of thin sheets interposed between a face of said disk and said wall, and means for preventing displacement of said sheets with respect to one another.

16. The combination of a casing, a rotary flexible shaft extending through a wall thereof, a disk surrounding said shaft and a diaphragm formed of a plurality of semi-annular thin sheets superposed to break joints interposed between a face of said disk and said wall.

In testimony whereof I have signed my name to this specification in the presence of two subscribing witnesses.

ALBERT E. GUY.

Witnesses:
PARK BENJAMIN, Jr.,
JANET A. GLENDINNING.